United States Patent
Suchta et al.

(10) Patent No.: US 7,275,750 B2
(45) Date of Patent: *Oct. 2, 2007

(54) ROLL CONTROL SYSTEM, DEVICE AND METHOD FOR CONTROLLING VEHICLE STABILITY

(75) Inventors: Wojciech E. Suchta, Richmond Hills (CA); Chandra S. Namuduri, Troy, MI (US)

(73) Assignee: General Motors Corporation, Detroit, MI (US)

( * ) Notice: Subject to any disclaimer, the term of this patent is extended or adjusted under 35 U.S.C. 154(b) by 266 days.

This patent is subject to a terminal disclaimer.

(21) Appl. No.: 10/945,937

(22) Filed: Sep. 21, 2004

(65) Prior Publication Data

US 2005/0253350 A1 Nov. 17, 2005

Related U.S. Application Data

(60) Provisional application No. 60/570,205, filed on May 12, 2004.

(51) Int. Cl.
*B60G 17/08* (2006.01)
*F16F 9/53* (2006.01)

(52) U.S. Cl. .............................. 280/5.511; 188/267.2; 280/124.106

(58) Field of Classification Search ............ 280/5.508, 280/5.51, 124.106, 5.511; 188/266.3, 267.2, 188/290
See application file for complete search history.

(56) References Cited

U.S. PATENT DOCUMENTS

| 4,796,911 | A | * | 1/1989 | Kuroki et al. ............ 280/5.511 |
| 5,630,623 | A | | 5/1997 | Ganzel ....................... 280/772 |
| 5,878,997 | A | * | 3/1999 | Miesner .................. 267/140.14 |
| 6,279,701 | B1 | | 8/2001 | Namuduri et al. ........ 188/267.2 |
| 6,354,607 | B1 | * | 3/2002 | Kawashima et al. ..... 280/5.511 |
| 6,390,252 | B1 | | 5/2002 | Namuduri et al. ........ 188/267.2 |
| 6,390,253 | B1 | * | 5/2002 | Oliver ...................... 188/267.2 |
| 6,464,051 | B2 | * | 10/2002 | Lisenker et al. .......... 188/267.2 |
| 6,471,018 | B1 | * | 10/2002 | Gordaninejad et al. .. 188/267.1 |
| 6,681,905 | B2 | * | 1/2004 | Edmondson et al. .... 188/267.2 |
| 6,811,166 | B2 | * | 11/2004 | Carlstedt et al. ........ 280/124.152 |
| 6,866,276 | B2 | * | 3/2005 | Carlstedt et al. ........ 280/124.107 |

(Continued)

FOREIGN PATENT DOCUMENTS

KR  2003004147 A  *  1/2003

*Primary Examiner*—Paul N. Dickson
*Assistant Examiner*—Laura B. Freedman

(57) ABSTRACT

A roll control system for a vehicle is disclosed. The roll control system includes front and rear stabilizer bars, first and second magnetorheological actuators, and an electronic control system. The first magnetorheological actuator is disposed between the front stabilizer bar and the front suspension on one side of the vehicle, and a first droplink is disposed between the front stabilizer bar and the front suspension on the other side of the vehicle. The second magnetorheological actuator is disposed between the rear stabilizer bar and the rear suspension on one side of the vehicle, and a second droplink is disposed between the rear stabilizer bar and the rear suspension on the other side of the vehicle. The electronic control system is responsive to a vehicle operating characteristic and is in signal communication with the first and second magnetorheological actuators. The first and second actuators are responsive to a control signal from the electronic control system such that they are locked in response to the vehicle undergoing a cornering maneuver, and are unlocked in response to the vehicle not undergoing a cornering maneuver.

17 Claims, 8 Drawing Sheets

U.S. PATENT DOCUMENTS

| | | | |
|---|---|---|---|
| 6,874,603 B2* | 4/2005 | Lisenker et al. | 188/267.2 |
| 6,948,707 B2* | 9/2005 | Gradu | 267/191 |
| 6,953,108 B2* | 10/2005 | Anderfaas et al. | 188/267.2 |
| 2003/0000781 A1* | 1/2003 | Oliver et al. | 188/267.2 |
| 2004/0173985 A1* | 9/2004 | Bruhl et al. | 280/124.106 |
| 2005/0179219 A1* | 8/2005 | Barron | 280/5.506 |

* cited by examiner

ROLL CONTROL SYSTEM, DEVICE AND METHOD FOR CONTROLLING VEHICLE STABILITY

CROSS REFERENCE TO RELATED APPLICATIONS

This application claims the benefit of U.S. Provisional Application No. 60/570,205, filed May 12, 2004, which is incorporated herein by reference in its entirety.

BACKGROUND OF THE INVENTION

The present disclosure relates generally to a roll control system, device and method for controlling vehicle stability, and particularly to a magnetorheological actuator for purposes thereof.

A vehicle roll or stability control system may consist of a passive anti-roll bar made up of solid or hollow steel tubes connected between the left and right body suspension points in the front and rear of the vehicle. During cornering at high velocities, the centrifugal forces on the body of a vehicle tend to push the body roll angle toward its stability limit. With a suitably designed anti-roll (stabilizer) bar, the vehicle roll angle may be reduced under such maneuvers and the vehicle roll-over propensity minimized. However, a passive anti-roll bar tends to increase the suspension harshness by transmitting road disturbances such as single wheel pot hole or bump events to the passenger compartment, resulting in a less than desirable ride quality. An active or semi-active roll control system may engage the anti-roll bar only when needed and disengage it otherwise, thereby improving the ride quality. However, typical active roll-control systems require a hydraulic pump and a hydraulic control, thereby driving up system complexity and cost.

While existing anti-roll actuators, roll control systems and methods for controlling vehicle stability are suitable for their intended purpose, there remains a need in the art for improvements that overcome these drawbacks.

BRIEF DESCRIPTION OF THE INVENTION

Embodiments of the invention disclose a roll control system for a vehicle. The roll control system includes front and rear stabilizer bars, first and second magnetorheological actuators, and an electronic control system. The first magnetorheological actuator is disposed between the front stabilizer bar and the front suspension on one side of the vehicle, and a first droplink is disposed between the front stabilizer bar and the front suspension on the other side of the vehicle. The second magnetorheological actuator is disposed between the rear stabilizer bar and the rear suspension on one side of the vehicle, and a second droplink is disposed between the rear stabilizer bar and the rear suspension on the other side of the vehicle. The electronic control system is responsive to a vehicle operating characteristic and is in signal communication with the first and second magnetorheological actuators. The first and second actuators are responsive to a control signal from the electronic control system such that they are locked in response to the vehicle undergoing a cornering maneuver, and are unlocked in response to the vehicle not undergoing a cornering maneuver.

Further embodiments of the invention disclose a magnetorheological actuator having first, second and third portions, and a magnetic field generator. The first and second portions are disposed having a translational degree of freedom with respect to each other, the third portion has a rotational degree of freedom with respect to the first and second portions, the first and third portions are coupled via a translation-to-rotation converter, the second and third portions coupled via a magnetorheological fluid, and the magnetic field generator is in field communication with the magnetorheological fluid. The third portion is rotationally responsive to translational motion between the first and second portions, and the shear stress characteristic of the magnetorheological fluid is responsive to the magnetic field generator, such that a rotational braking action of the third portion results from field excitation at the magnetic field generator.

Yet further embodiments of the invention disclose a stabilizer control system for a vehicle having a suspension with a stabilizer bar and a support. The stabilizer control system includes a plurality of sensors responsive to at least one operating characteristic of the vehicle, a controller responsive to signals from the plurality of sensors, and a magnetorheological actuator disposed between the stabilizer bar and the support. The actuator includes first, second and third portions, and a magnetic field generator. The first and second portions are disposed having a translational degree of freedom with respect to each other, the third portion has a rotational degree of freedom with respect to the first and second portions, the first and third portions are coupled via a translation-to-rotation converter, the second and third portions are coupled via a magnetorheological fluid, and the magnetic field generator is in field communication with the magnetorheological fluid. The third portion is rotationally responsive to translational motion between the first and second portions, the shear stress characteristic of the magnetorheological fluid is responsive to the magnetic field generator, and the magnetic field generator is responsive to an activation signal from the controller. The magnetorheological actuator is responsive to the controller such that an activation signal from the controller causes an increase in the shear strength of the magnetorheological fluid, a rotational braking action at the actuator, and translational motion restraint between the stabilizer bar and the support.

Additional embodiments of the invention disclose a method of controlling a vehicle stabilizer system, the system having a plurality of sensors responsive to at least one operating characteristic of the vehicle, a controller responsive to the sensors, and an actuator responsive to the controller and disposed between a first part and a second part of the vehicle suspension. A signal is received at the controller from the plurality of sensors, the sensor signal is analyzed, and an activation signal generated in response thereto. The actuator is activated in response to the activation signal so as to cause a braking action at the actuator and restraint of motion between the first and second parts of the vehicle suspension.

BRIEF DESCRIPTION OF THE DRAWINGS

Referring to the exemplary drawings wherein like elements are numbered alike in the accompanying FIGS..

DETAILED DESCRIPTION OF THE INVENTION

An embodiment of the invention utilizes magnetorheological (MR) actuators with locking and unlocking capability on two sides of each of the front and rear stabilizer bars of a vehicle. An alternative embodiment utilizes one magnetorheological actuator on one side of each of the front and rear stabilizer bars. The front and rear stabilizer bars preferably have increased stiffness compared to the standard passive stabilizer bar used in a typical vehicle. An electronic control module (controller) is used with a vehicle lateral accelerometer, a steering angle sensor and a vehicle speed sensor. In response to the vehicle speed, steering angle and lateral acceleration, the control module may or may not send an activation signal to lock or unlock the actuators. During cornering, the actuators are controlled to be in a locked condition that engages the stabilizer bars and reduces vehicle roll angle. In the absence of cornering, the actuators are controlled to be in an unlocked condition thereby decoupling the stabilizer bars from the rest of the suspension of the vehicle for improved ride performance.

Figure 1:
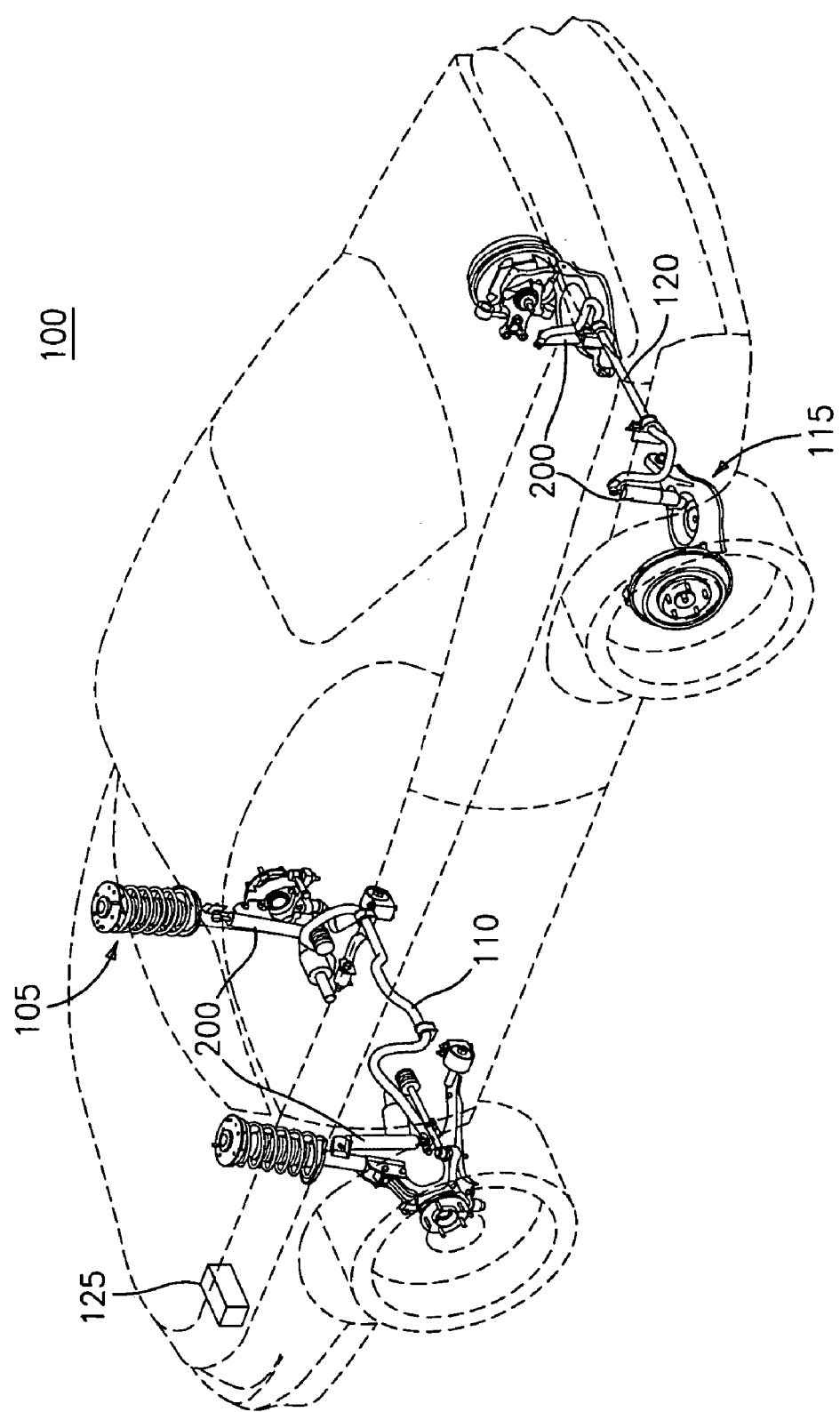
FIG. 1 depicts an exemplary vehicle for implementing embodiments of the invention.

FIG. 1 is an exemplary embodiment of a vehicle 100 having a front suspension system 105, a front (preferably high stiffness) stabilizer bar 110, a rear suspension system 115, and a rear (preferably high stiffness) stabilizer bar 120. Roll-control (stabilizer) actuators 200 connect each end of front and rear stabilizer bars 110, 120 to portions of front and rear suspension systems 105, 115, respectively. While FIG. 1 depicts vehicle 100 having four roll-control actuators 200, embodiments of the invention may employ only two roll-control actuators 200, with one actuator on one side of each of front and rear stabilizer bars 110, 120. In an embodiment having only one roll control actuator 200 per stabilizer bar on one side of vehicle 100, the other side of the respective stabilizer bar on the other side of the vehicle is coupled to the respective suspension system via a suspension droplink, generally shown as numeral 200 in the figures but understood to mean a droplink when used in that context.

Embodiments of the invention may use any one of several different types of magnetorheological roll-control actuators 200 depending on the packaging space. An exemplary magnetorheological (MR) roll-control actuator 200 is an actuator that utilizes a minimum amount of MR fluid 222 and achieves the required locking force while transmitting minimum force during an unlocked condition. In an embodiment, the amount of MR fluid 222 used is equal to or less than about 50 cc (cubic centimeters), and preferably equal to or less than about 10 cc, compared with more than 100 cc used in other MR actuator type devices. However, it is also within the scope of this invention to use linearly translating MR actuators that use greater than about 50 cc of MR material.

Figure 2:
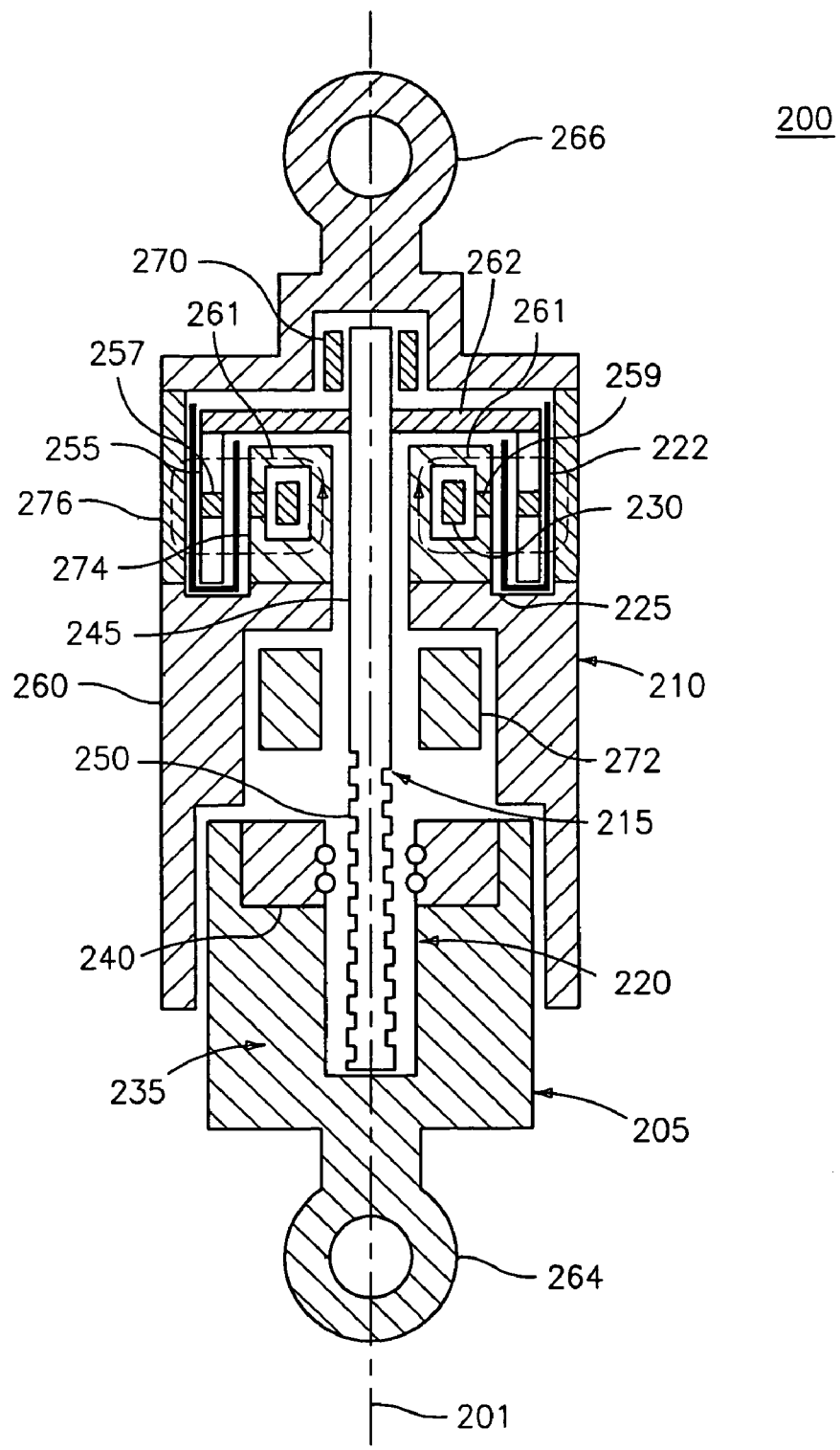
FIG. 2 depicts a cross-section block representation of a magnetorheological actuator in accordance with embodiments of the invention.
Figure 3:
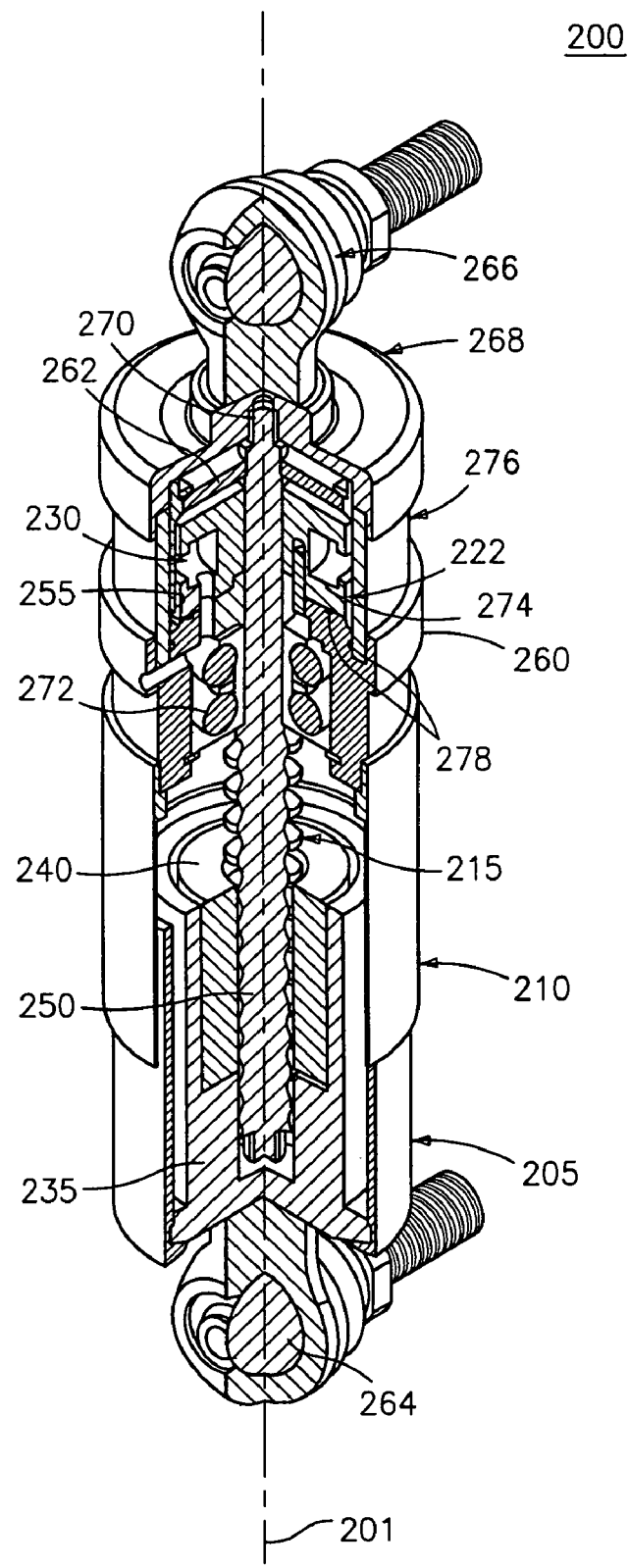
FIG. 3 depicts a cutaway cross-section detail view of the magnetorheological actuator of FIG. 2.

Reference is now made to FIGS. 2 and 3, where FIG. 2 depicts a cross-section block representation and FIG. 3 depicts a cutaway cross-section detail view of MR actuator 200. In general, MR actuator 200 utilizes a magnetorheological fluid 222 dispensed in an annular space 225 between two concentric cylinders 274, 276 where it is subjected to a controllable magnetic field. Under zero magnetic field, the fluid 222 can be sheared easily producing little resistance to rotation, whereas under higher magnetic fields, the fluid 222 exhibits a high yield stress that resists rotation and therefore generates significant opposing torque on a rotor 255 within MR actuator 200.

Referring to FIG. 2, MR actuator 200 includes first 205, second 210 and third 215 portions. First and second portions 205, 210 are disposed having a translational degree of freedom parallel to axis 201 with respect to each other, and third portion 215 is disposed having a rotational degree of freedom about axis 201 with respect to the first and second portions 205, 210. First and third portions 205, 215 are coupled via a translation-to-rotation converter 220, second and third portions 210, 215 are coupled via a magnetorheological fluid 222 within annulus 225, and a magnetic field generator 230 is in field communication with the magnetorheological fluid 222 within annulus 225. Third portion 215 is rotationally responsive to translational motion between the first and second portions 205, 210, and the shear stress characteristic of the magnetorheological fluid 222 within annulus 225 is responsive to magnetic field generator 230, such that a rotational braking action of third portion 215 results from field excitation at magnetic field generator 230.

In an embodiment, first portion 205 includes a tube 235 having a ball nut 240, third portion 215 includes a shaft 245 having a ball screw 250 at one end and a magnetic rotor ring 255 at an opposing end, and second portion 210 includes a housing 260 receptive of ball nut 240, shaft 245 and magnetic field generator 230. Ball screw 250 is engagingly disposed at ball nut 240 for rotational motion therebetween, and magnetic rotor ring 255 is disposed within the magnetorheological fluid 222 at annulus 225 for fluid communication therebetween.

A more detailed description of MR actuator 200 will now be made with reference to FIG. 3. In an embodiment, first, second and third portions 205, 210, 215 form a linear-to-rotary conversion device made up of ball screw 250 and ball nut 240, where ball nut 240 is attached to a lower tube 235, and ball screw 250 is attached to cylindrical magnetic rotor ring 255 through a non-magnetic support disc 262. Tube 235 is attached to a lower ball joint 264, which is attached to one end of torsion bar 110 or 120 (see FIG. 1). An upper ball joint 266 of MR actuator 200 is secured within a housing top cover 268, and is attached to a support portion 280, such as a strut for example, of vehicle suspension system 105 or 115 (see FIG. 1). While upper and lower ball joints 264, 266 are described and illustrated having specific attachment arrangements, it will be appreciated that upper and lower ball joints 264, 266 may be attached to different parts of vehicle 100 depending on the type of suspension employed (see front and rear suspensions 105, 115 in FIGS. 7 and 8, for example). Ball screw 250 is secured to rotate within a non-magnetic housing 260 and housing top cover 268 by means of a bushing 270 and a thrust ball bearing 272. As ball nut 240 travels up and down with tube 235 due to vehicle body movements, ball screw 250 rotates in one direction or the other, along with magnetic rotor ring 255 and attached support disc 262. Magnetic rotor ring 255 is disposed within two soft magnetic stator portions, an inner core 274 and an outer ring 276, that are secured to housing 260. Inner core 274 carries an encapsulated magnetic coil (magnetic field generator) 230. The annulus 225 formed between magnetic rotor ring 255 and inner and outer stator portions 274, 276 is filled with magnetorheological fluid 222 that is prevented from leaking out of MR actuator 200 by using static O-ring seals 278 between stator portions 274, 276 and housing 260.

When an electrical current is passed through coil 230 from an external source such as the vehicle battery 125 (depicted in FIG. 4), a magnetic field is produced in the radial direction with respect to axis 201 across annulus 225 between stator portions 274, 276 and magnetic rotor ring 255. The middle portion 257 of the rotor ring 255 and the middle portion 259 of cylinder 274 are made up of substantially non-magnetic material (such as, stainless steel, aluminum, brass, for example) or made of such thickness that it prevents significant amount of magnetic flux being diverted away from the outer portion of annulus 225 (depicted in FIG. 2). The strength of the magnetic field or flux density within MR fluid 222 determines the shear stress characteristics of MR fluid 222, thereby controlling the degree of torque that acts to resist the rotation of magnetic rotor ring 255. The resulting magnetic flux lines 261 that traverse annulus 225 are depicted in FIG. 2. The resistance torque acting on magnetic rotor ring 255 translates to a force that resists the linear movement of ball nut 240 and attached lower tube 235. By the appropriate selection of the pitch of ball screw 250, the axial and radial dimensions of stator portions 274, 276 and magnetic rotor ring 255, the number turns of coil 230, the maximum current through coil 230, and an MR fluid 222 with a suitable concentration of iron particles, a force sufficient to lock the translation movement of torsion bar 110 or 120 may be generated by activated MR actuators 200. Similarly, the above noted parameters may be chosen in such a way as to achieve minimum force generation when the current through coil 230 is set to zero, thereby resulting in a de-coupled operation of stabilizer bar 110, 120 for a quality ride.

Figure 4:
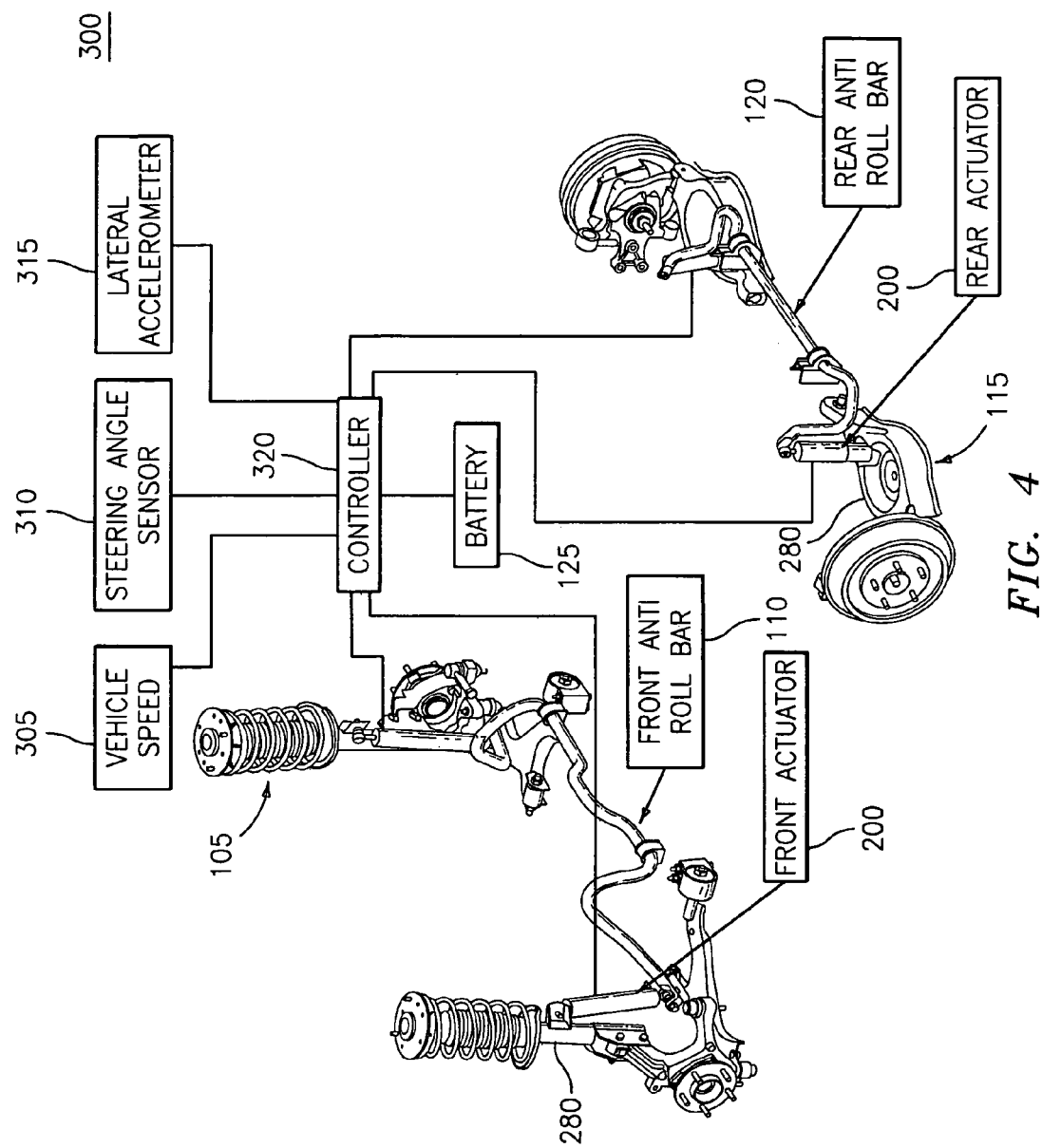
FIG. 4 depicts an exemplary stabilizer control system in accordance with embodiments of the invention.

The utilization of MR actuator 200 in a stabilizer control system 300 will now be described with reference to FIG. 4. In an embodiment, stabilizer control system 300, also herein referred to as a roll control system, includes a plurality of sensors 305, 310, 315, a controller 320, at least one MR actuator 200, and front and rear stabilizer bars 110, 120. Sensors 305, 310, 315 and controller 320 may also be herein referred to as an electronic control system. In an embodiment, the plurality of sensors includes a vehicle speed sensor 305, a steering angle sensor 310, and a lateral accelerometer 315, which are responsive to the respective operating characteristic of vehicle 100. Controller 320 is responsive to signals from the plurality of sensors 305, 310, 315 for generating an activation signal that causes an increase in the shear strength of the MR fluid 222, a rotational braking action at magnetic rotor ring 255 of MR actuator 200, a locking condition at translation-to-rotation converter 220, and translational motion restraint of stabilizer bar 110 and/or 120.

Figure 5:
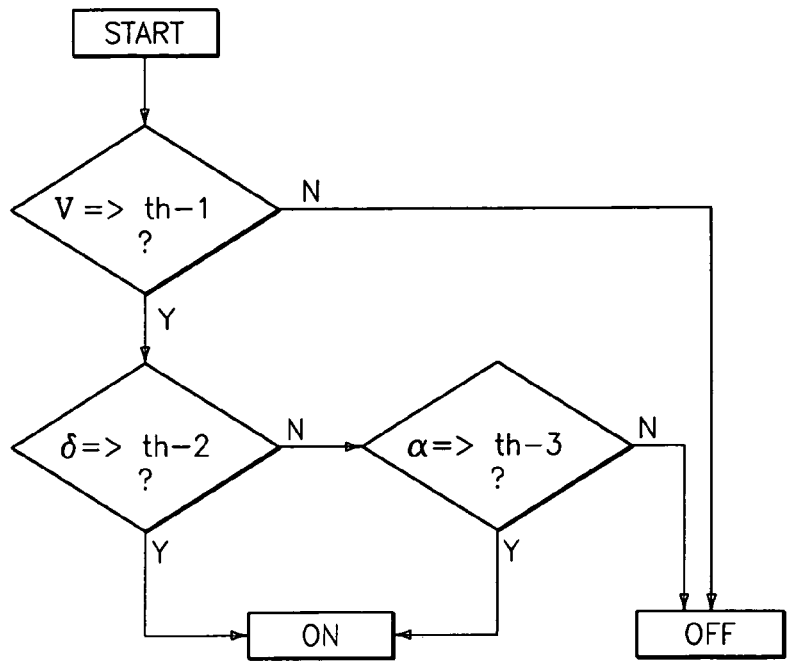
FIGS. 5 and 6 depict alternative flowcharts for practicing embodiments of the invention.
Figure 6:
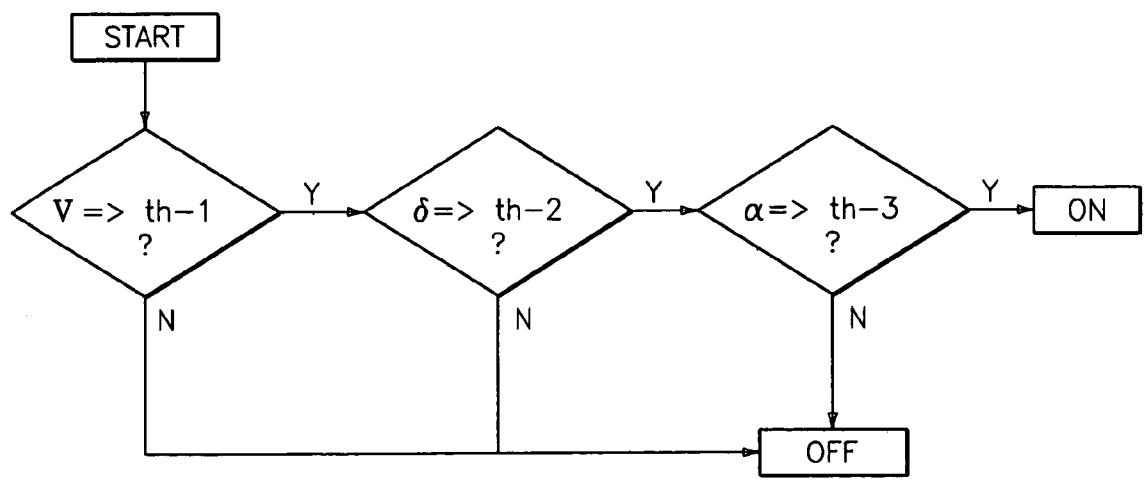

In an embodiment, and with reference to FIGS. 5 and 6, the activation signal from controller 320 is active (ON) in response to the vehicle speed (V) being equal to or greater than a first threshold value (th-1), and at least one of; the magnitude of a steering angle change (δ) from a neutral position being equal to or greater than a second threshold (th-2), and the magnitude of the vehicle lateral acceleration (α) being equal to or greater than a third threshold (th-3), whereby an active (ON) signal causes the locking condition discussed previously. In the embodiment illustrated by FIG. 5, speed V must equal or exceed threshold th-1, and either steering angle change δ must equal or exceed threshold th-2 or lateral acceleration a must equal or exceed threshold th-3, for the activation signal to be ON. In the embodiment illustrated by FIG. 6, all three vehicle operating characteristics must equal or exceed the respective threshold value for the activation signal to be ON.

In view of the foregoing, embodiments of the invention may perform a method of controlling a vehicle stabilizer system 300 by, receiving at controller 320 signals from sensors 305, 310, 315, analyzing the signals and generating an activation signal in response thereto, and activating MR actuator 200 in response to the activation signal so as to cause an increase in the shear strength of MR fluid 222, a rotational braking action at magnetic rotor ring 255 of MR actuator 200, a locking condition at translation-to-rotation converter 220, and translational motion restraint of stabilizer bar 110 and/or 120. In an embodiment, stabilizer system includes stabilizer bars 110, 120 connected to suspensions 105, 115 of vehicle 100, a plurality of sensors 305, 310, 315 responsive to at least one operating characteristic of vehicle 100, controller 320, and MR actuator 200.

Figure 7:
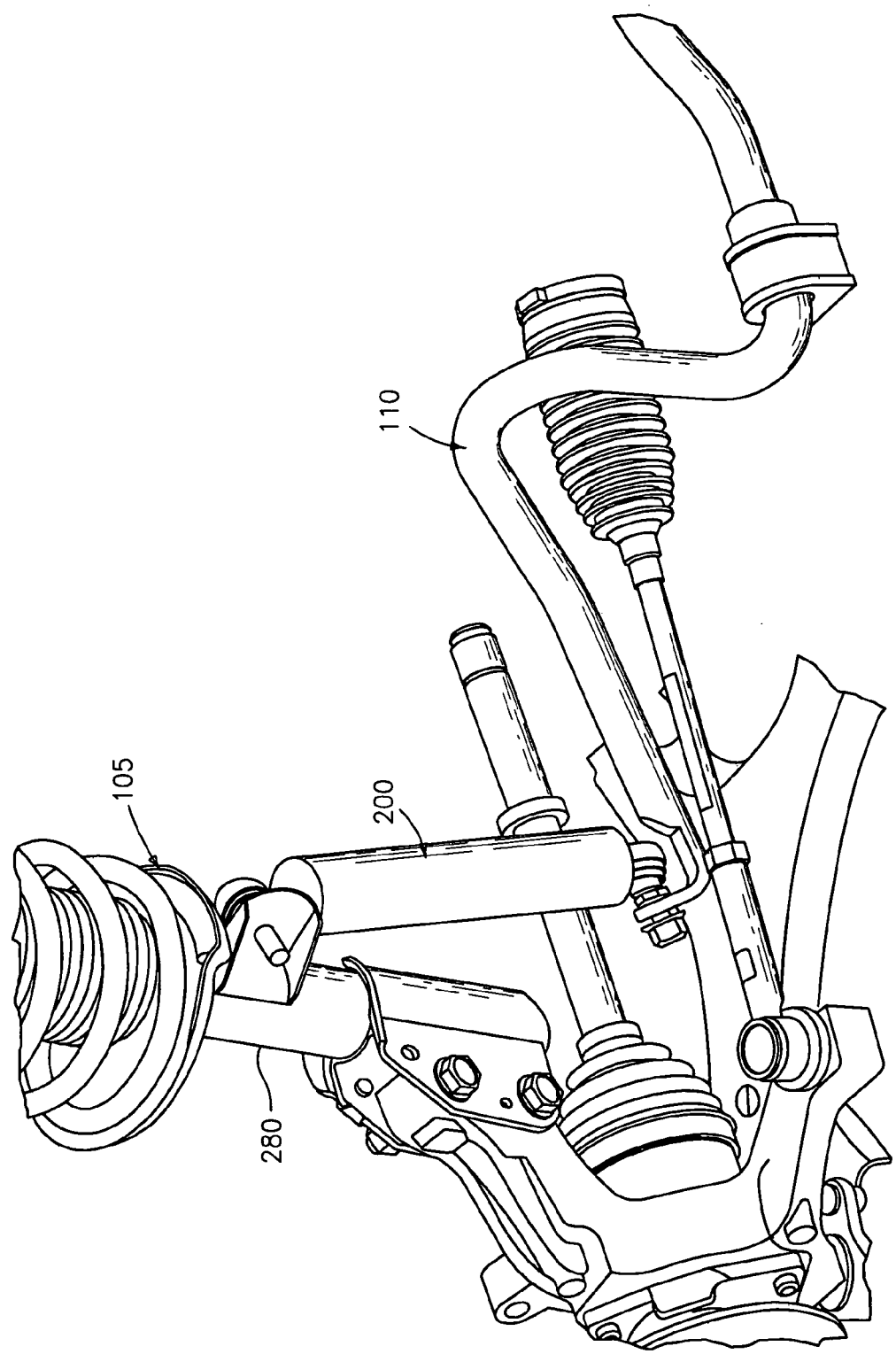
FIGS. 7 and 8 depict more detailed exemplary isometric views of portions of the suspension of the vehicle in FIG. 1 in accordance with embodiments of the invention.
Figure 8:
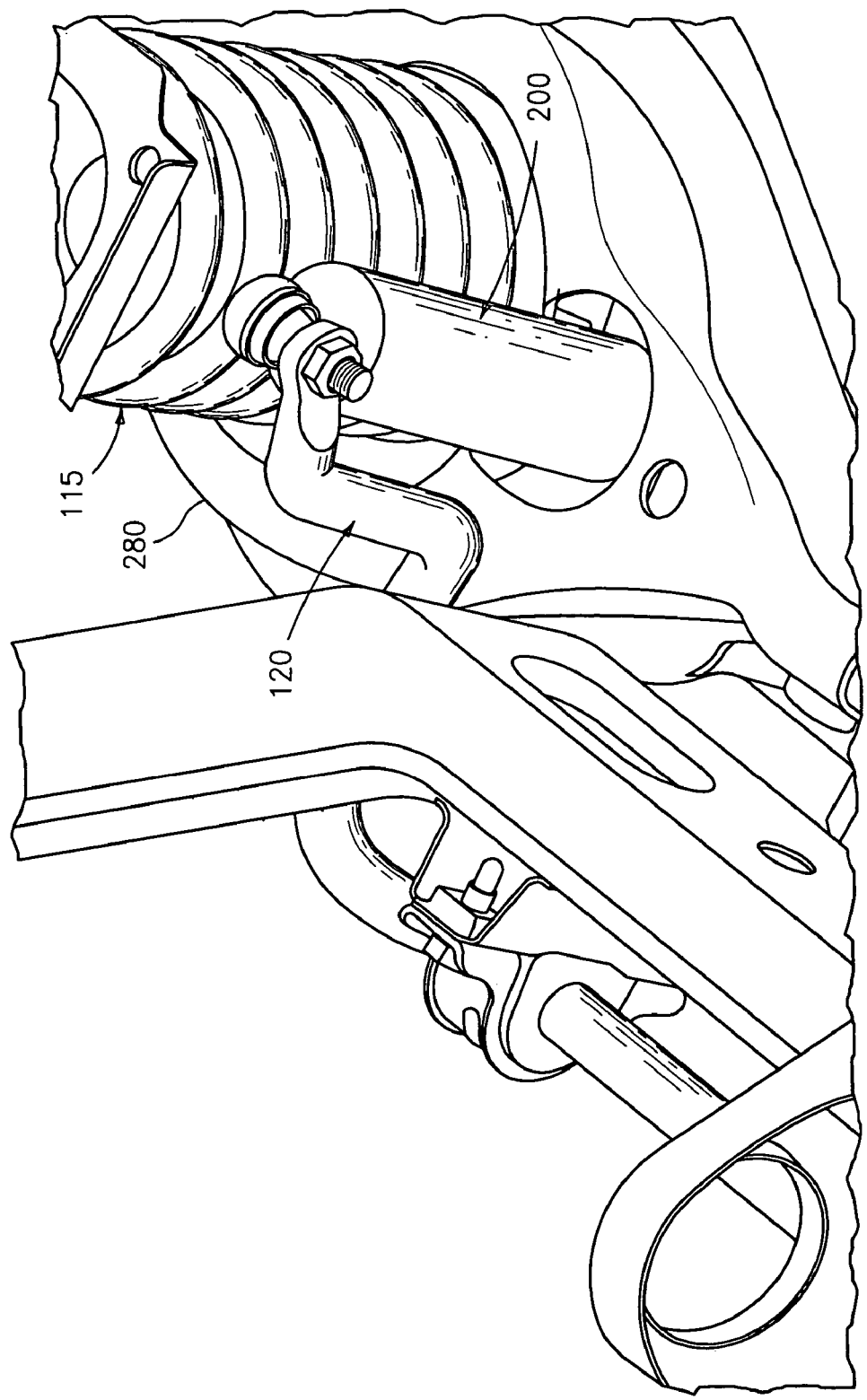
Figure 10:
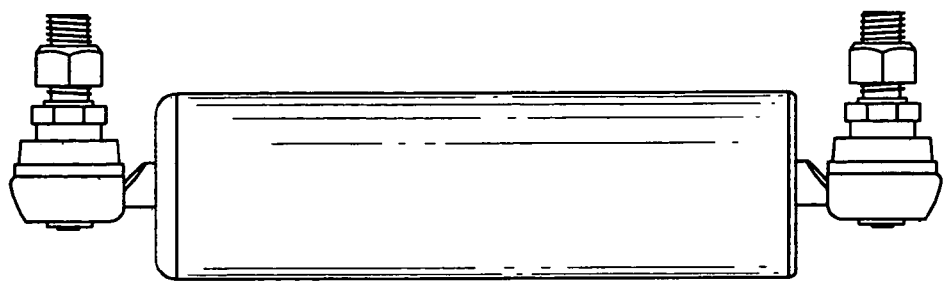
FIGS. 9 and 10 depict exemplary configurations of the magnetorheological actuator of FIG. 3.
Figure 9:
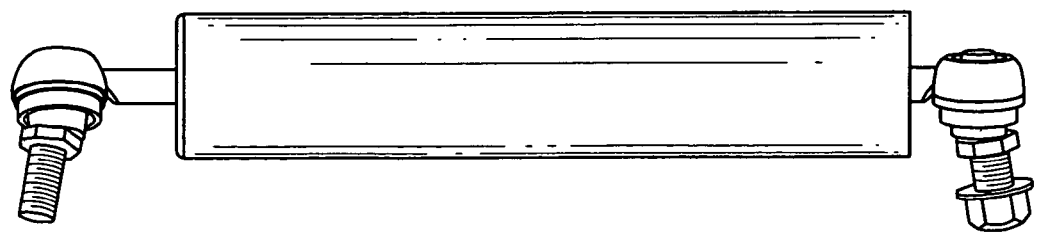

FIGS. 7 and 8 depict more detailed isometric views of portions of suspension 105, 115 of vehicle 100 with an actuator such as MR actuator 200, and FIGS. 9 and 10 depict exemplary configurations of MR actuator 200 with exemplary dimensions. In response to actuator 200 being powered (locked), stabilizer bars 110, 120 are effectively connected to suspension systems 105, 115, respectively, and in response to actuator 200 not being powered (free sliding), stabilizer bars 110, 120 are effectively disconnected from suspension systems 105, 115, respectively. A locked actuator 200 results in a stiffer riding vehicle 100, while a free sliding actuator 200 results in a softer riding vehicle 100.

Exemplary actuator forces for MR actuator 200 in front suspension system 105 having two force members and no side forces, are: a maximum holding force of about 2 to about 6 kN (kilo-Newtons) under very low velocity (such as about equal to zero velocity for example) when powered; and, a low damping force such as about 20 to about 600 N (Newtons) at a velocity of about 1 m/sec when not powered.

Exemplary actuator forces for MR actuator 200 in rear suspension system 115 having two force members and no side forces, are: a maximum holding force of about 2 to about 6 kN under very low velocity (such as about equal to zero velocity for example) when powered; and, a low damping force such as about 20 to about 600 N at a velocity of about 1 m/sec when not powered.

In view of the foregoing examples, actuator 200 is effectively locked for axial loads equal to or less than about 6 kN, or alternatively equal to or less than about 2 kN, when the activation signal is ON, and actuator 200 is effectively unlocked for axial loads equal to or greater than about 20 N, or alternatively equal to or greater than about 600N, when the activation signal is OFF. However, it will be appreciated that the locked and unlocked actuator forces disclosed herein are exemplary only, and that such disclosure is not intended to be limiting in any way.

An exemplary MR actuator 200 may exhibit some of the following: a maximum velocity when not powered of 4 meters/sec at an input voltage of 12 VDC; a minimum tensile/compression strength when not powered (at maximum extended and compressed positions) of about 6 to about 12 kN; suitability for use at an operating temperature range of −40 degrees Celsius to +130 degrees Celsius; suitability for use at a maximum temperature for continuous operation of 110 degrees Celsius; an absence of MR fluid leakage, seal hardening, or hydraulic stacking at operating temperatures; functionality under exposure to dust (with or without a dust shield), dirt, corrosion, gas, oil, cleaners, and other vehicle fluids; durability over 10 years or 100,000 miles of use, whichever occurs first. As disclosed, some embodiments of the invention may include some of the following advantages: a low cost automotive roll-control system absent the requirement of a hydraulic pump or hydraulic power; lower system cost as a result of small MR fluid usage; lower system cost due to the elimination of gas springs, high-pressure seals and special rod and tube finishes required to minimize abrasion in a telescopic MR damper-type device; reduced roll gain (roll gain being a measure of the amount of roll angle experienced by the vehicle during a turn, or alternatively, the measure of roll angle as a function of lateral axel acceleration); improved ride comfort and quality; de-coupling of the anti-roll (stabilizer) bar from a single wheel event; reduced head toss during a vehicle maneuver; the ability to increase the structural stiffness of the anti-roll (stabilizer) bars by activating and de-activating stabilizer actuators; utilization of an MR actuator that provides a minimum force in the off-state for a given lock-up force; utilization of an MR actuator that has a fast response time on the order of 10 milliseconds, consumes zero or an insubstantial amount of power under normal driving conditions when the roll-bar is unlocked or disengaged, and requires less than 25 Watts of power during the time the roll-bar is locked or engaged during a transient maneuver; the ability to be utilized in semi-active roll control systems with controllable roll rate; reduced package size due to the elimination of hydraulic pump, accumulator and hydraulic lines; the ability to control the vehicle roll rate as a function of vehicle dynamics; and increase in vehicle stability due to reduced vehicle roll angle during cornering; the ability to be utilized for controlling vehicle stability in vehicle oversteering conditions; improved vehicle ride quality during straight driving; minimal parasitic power consumption due to the absence of electrical or hydraulic power demand under normal driving operation; and, a significant reduction in roll gain from about 4 degrees per g-force to about 2 degrees per g-force.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A roll control system for a vehicle having a front suspension and a rear suspension, the roll control system comprising:

a front stabilizer bar;

a rear stabilizer bar;

a first magnetorheological actuator disposed between the front stabilizer bar and a support portion of the front suspension on one side of the vehicle, and a first droplink disposed between the front stabilizer bar and the front suspension on the other side of the vehicle;

a second magnetorheological actuator disposed between the rear stabilizer bar and a support portion of the rear suspension on one side of the vehicle, and a second droplink disposed between the rear stabilizer bar and the rear suspension on the other side of the vehicle; and an electronic control system responsive to a vehicle operating characteristic and in signal communication with the first and second magnetorheological actuators;

wherein the first and second actuators are responsive to a control signal from the electronic control system such that they are locked in response to the vehicle undergoing a cornering maneuver, and are unlocked in response to the vehicle not undergoing a cornering maneuver; and wherein in response to either of the first and second magnetorheological actuators being locked, an end of the respective stabilizer bar connected thereto is restrained from translational movement in a direction defined by an axis of the respective magnetorheological actuator.

2. The roll control system of claim 1, wherein:

the first droplink is a third magnetorheological actuator; and the second droplink is a fourth magnetorheological actuator;

wherein the third and fourth actuators are responsive to a control signal from the electronic control system such that they are locked in response to the vehicle undergoing a cornering maneuver, and are unlocked in response to the vehicle not undergoing a cornering maneuver.

3. A magnetorheological actuator, comprising:

first, second and third portions;

the first and second portions disposed having a translational degree of freedom with respect to each other;

the third portion having a rotational degree of freedom with respect to the first and second portions;

the first and third portions coupled via a translation-to-rotation converter;

the second and third portions coupled via a magnetorheological fluid; and a magnetic field generator in field communication with the magnetorheological fluid;

wherein the third portion is rotationally responsive to translational motion between the first and second portions, and the shear stress characteristic of the magnetorheological fluid is responsive to the magnetic field generator, such that a rotational braking action of the third portion results from field excitation at the magnetic field generator;

wherein in response to field excitation at the magnetic field generator, the first and second portions are restrained from having translational motion relative to each other in response to a first axial load between the two portions; and wherein in response to no field excitation at the magnetic field generator, the first and second portions are allowed to have translational motion relative to each other in response to a second axial load between the two portions.

4. The actuator of claim 3 wherein:

the first portion comprises a tube having a ball nut;

the third portion comprises a shaft having a ball screw at one end and a magnetic rotor ring at an opposing end, the ball screw engagingly disposed at the ball nut, the magnetic rotor ring disposed within the magnetorheological fluid; and the second portion comprises a housing receptive of the ball nut, the shaft and the magnetic field generator.

5. The actuator of claim 3, wherein:

the second portion comprises two concentric cylindrical surfaces defining an annular space therebetween, the magnetorheological fluid being disposed within the annular space; and the third portion comprises a cylindrical magnetic rotor ring disposed within the fluid within the annular space.

6. The actuator of claim 5, wherein the third portion comprises a middle section made of substantially nonmagnetic material.

7. The actuator of claim 5, wherein the annular space is sized to contain equal to or less than about 50 cubic centimeters of the magnetorheological fluid.

8. The actuator of claim 7, wherein the annular space is sized to contain equal to or less than about 10 cubic centimeters of the magnetorheological fluid.

9. The actuator of claim 3, wherein:
the first axial load is equal to or less than about 6 kilo-Newtons; and
the second axial load is equal to or greater than about 20 Newtons.

10. A stabilizer control system for a vehicle having a suspension with a stabilizer bar and a support, the stabilizer control system comprising:
a plurality of sensors responsive to at least one operating characteristic of the vehicle;
a controller responsive to signals from the plurality of sensors; and
a magnetorheological actuator disposed between the stabilizer bar and the support, the actuator comprising:
first, second and third portions;
the first and second portions disposed having a translational degree of freedom with respect to each other;
the third portion having a rotational degree of freedom with respect to the first and second portions;
the first and third portions coupled via a translation-to-rotation converter;
the second and third portions coupled via a magnetorheological fluid; and
a magnetic field generator in field communication with the magnetorheological fluid;
wherein the third portion is rotationally responsive to translational motion between the first and second portions, the shear stress characteristic of the magnetorheological fluid is responsive to the magnetic field generator, and the magnetic field generator is responsive to an activation signal from the controller;
wherein the magnetorheological actuator is responsive to the controller such that an activation signal from the controller causes an increase in the shear strength of the magnetorheological fluid, a rotational braking action at the actuator, and translational motion restraint between the stabilizer bar and the support.

11. The system of claim 10, wherein:
the plurality of sensors comprises a vehicle speed sensor, a steering angle sensor, and a lateral accelerometer; and
the activation signal is active in response to the vehicle speed being equal to or greater than a first threshold value, and at least one of the magnitude of a steering angle change from a neutral position being equal to or greater than a second threshold, and the magnitude of the vehicle lateral acceleration being equal to or greater than a third threshold.

12. The system of claim 11, wherein:
the activation signal is active in response to the magnitude of a steering angle change from a neutral position being equal to or greater than a second threshold, and the magnitude of the vehicle lateral acceleration being equal to or greater than a third threshold.

13. The system of claim 10, wherein:
the second portion comprises two concentric cylindrical surfaces defining an annular space therebetween, the magnetorheological fluid being disposed within the annular space, the annular space being sized to contain equal to or less than about 10 cubic centimeters of the magnetorheological fluid; and
the third portion comprises a cylindrical magnetic rotor ring disposed within the fluid within the annular space.

14. The system of claim 10, wherein:
in response to field excitation at the magnetic field generator, the first and second portions are restrained from having translational motion relative to each other in response to a first axial load between the two portions, the first axial load being equal to or less than about 6 kilo-Newtons; and
in response to no field excitation at the magnetic field generator, the first and second portions are allowed to have translational motion relative to each other in response to a second axial load between the two portions, the second axial load being equal to or greater than about 20 Newtons.

15. A method of controlling a vehicle stabilizer system, the system comprising a plurality of sensors responsive to at least one operating characteristic of the vehicle, a controller responsive to the sensors, an actuator responsive to the controller and disposed between a first part and a second part of the vehicle suspension, the method comprising:
receiving at the controller a signal from the plurality of sensors;
analyzing the sensor signal and generating an activation signal in response thereto; and
activating the actuator in response to the activation signal so as to cause a braking action at the actuator and restraint of motion between the first and second parts of the vehicle suspension;
wherein the plurality of sensors comprises a vehicle speed sensor, a steering angle sensor, and a lateral accelerometer, the method further comprising:
generating the activation signal in response to the vehicle speed being equal to or greater than a first threshold value, and at least one of; the magnitude of a steering angle change from a neutral position being equal to or greater than a second threshold, and the magnitude of the vehicle lateral acceleration being equal to or greater than a third threshold.

16. The method of claim 15, wherein the actuator is a magnetorheological actuator comprising:
first, second and third portions;
the first and second portions disposed having a translational degree of freedom with respect to each other;
the third portion having a rotational degree of freedom with respect to the first and second portions;
the first and third portions coupled via a translation-to-rotation converter;
the second and third portions coupled via a magnetorheological fluid; and
a magnetic field generator in field communication with the magnetorheological fluid;
the method further comprising:
increasing the shear strength of the magnetorheological fluid in response to the activation signal;
restraining rotational motion between the second and third portions of the actuator; and
restraining translational motion between the first and second portions of the actuator.

17. The method of claim 16, wherein the restraining translational motion further comprises:
restraining translation motion between the first and second portions of the actuator in response to an axial load between the two portions being equal to or less than about 6 kilo-Newtons.

* * * * *